(12) United States Patent
Suzuki

(10) Patent No.: US 7,493,929 B2
(45) Date of Patent: Feb. 24, 2009

(54) PNEUMATIC TIRE

(75) Inventor: Kazuya Suzuki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 178 days.

(21) Appl. No.: 11/400,307

(22) Filed: Apr. 10, 2006

(65) Prior Publication Data

US 2006/0289103 A1  Dec. 28, 2006

(30) Foreign Application Priority Data

Jun. 28, 2005  (JP) .......................... P2005-188609

(51) Int. Cl.
*B60C 15/00* (2006.01)
*B60C 15/02* (2006.01)
*B60C 15/024* (2006.01)

(52) U.S. Cl. ...................................... 152/539; 152/544

(58) Field of Classification Search ................. 152/539, 152/544

See application file for complete search history.

(56) References Cited

U.S. PATENT DOCUMENTS 5,458,175 A * 10/1995 Matsuura et al. ............ 152/454

FOREIGN PATENT DOCUMENTS

| JP | 6-199115 A | 7/1994 |
| JP | 9-263112 | * 10/1997 |

* cited by examiner

*Primary Examiner*—Justin Fischer
(74) *Attorney, Agent, or Firm*—Birch, Stewart, Kolasch & Birch, LLP

(57) ABSTRACT

A pneumatic tire to be mounted on a rim, comprises a pair of bead portions each having a bead core therein, wherein in a meridian section of the tire under a non-mounted state that the tire is not mounted on the rim but the bead portions are held such that the bead width is equal to the rim width of the rim, each bead portion has a profile comprising a bead base extending between a bead toe and a heel-side point, the bead base comprising an axial base width, a straight part extending from the bead toe toward the heel-side point having an inclination so that an extended line thereof passes through the heel-side point, a convex part provided between an axially outer end of the straight part and the heel-side point and protruding radially inside of the extended line, and the convex part having a radius of curvature of from 0.20 to 0.33 times the base width and a height from the extended line of from 0.067 to 0.13 times the base width.

3 Claims, 5 Drawing Sheets

PNEUMATIC TIRE

BACKGROUND OF THE INVENTION

1. Field of the Invention

The present invention relates to a pneumatic tire, more particularly to an improved bead profile which can improve resistance to displacement on a rim without deteriorating rim-mounting performance.

2. Description of the Related Art

As shown in FIG. 5, a bead portion (a) of a pneumatic tire comprises: a bead base (a1) with a heel diameter of Dp at the axially outer end thereof; and a bead core (c). The heel diameter Db, for example, has a smaller 0.7% than a rim-diameter (Dr) of a standard rim R so that the bead base (a1) is fastened onto a rim base Rb of the rim R tightly. Further, air filled up in the pneumatic tire forces the bead portion (a) to contact a rim flange Rf of the rim R. Thus, the tire is mounted on the rim tightly.

However, since the rim base Rb has an inclination of about 5 degrees with respect to the tire axial direction, the bead portion (a) tends to be displaced to the inside of the tire axial direction according to a decrease of the air. Further, if a side force is applied into the tire with such a condition, the bead portion (a) may be slipped on the rim base Rb, and then drop into rim well (not shown) of the rim R with getting over a hump Rb1.

SUMMARY OF THE INVENTION

It is therefore, an object of the present invention to provide a pneumatic tire with an improved bead profile which can improve resistance to displacement on a rim without deteriorating rim-mounting performance.

According to one aspect of the present invention, a pneumatic tire to be mounted on a rim, comprises
a tread portion,
a pair of sidewall portions,
a pair of bead portions each having a bead core therein,
a carcass comprising at least one ply of cords, wherein
in a meridian section of the tire under a non-mounted state that the tire is not mounted on the rim but the bead portions are held such that the bead width is equal to the rim width of the rim,
said each bead portion has a profile comprising
a bead toe,
a heel-side point being a point on the bead surface near the heel and having a diameter in a range of from 99.1 to 99.3% of a rim-diameter of the rim,
a bead base extending between the bead toe and the heel-side point,
the bead base comprising
a base width between the bead toe and the heel-side point in the tire axial direction,
a straight part extending from the bead toe toward the heel-side point having an inclination so that an extended line thereof passes through the heel-side point,
a convex part provided between an axially outer end of the straight part and the heel-side point and protruding radially inside of the extended line, and
the convex part having a radius of curvature of from 0.20 to 0.33 times the base width and a protruding height from the extended line of from 0.067 to 0.13 times the base width.

Here, dimensions of each part of the tire are measured in above-mentioned non-mounted state unless there is a definition about a state of the tire in particular.

BRIEF DESCRIPTION OF THE DRAWINGS

Embodiments of the present invention will now be described in detail in conjunction with the accompanying drawings.

DESCRIPTION OF THE PREFERRED EMBODIMENTS

Figure 1:
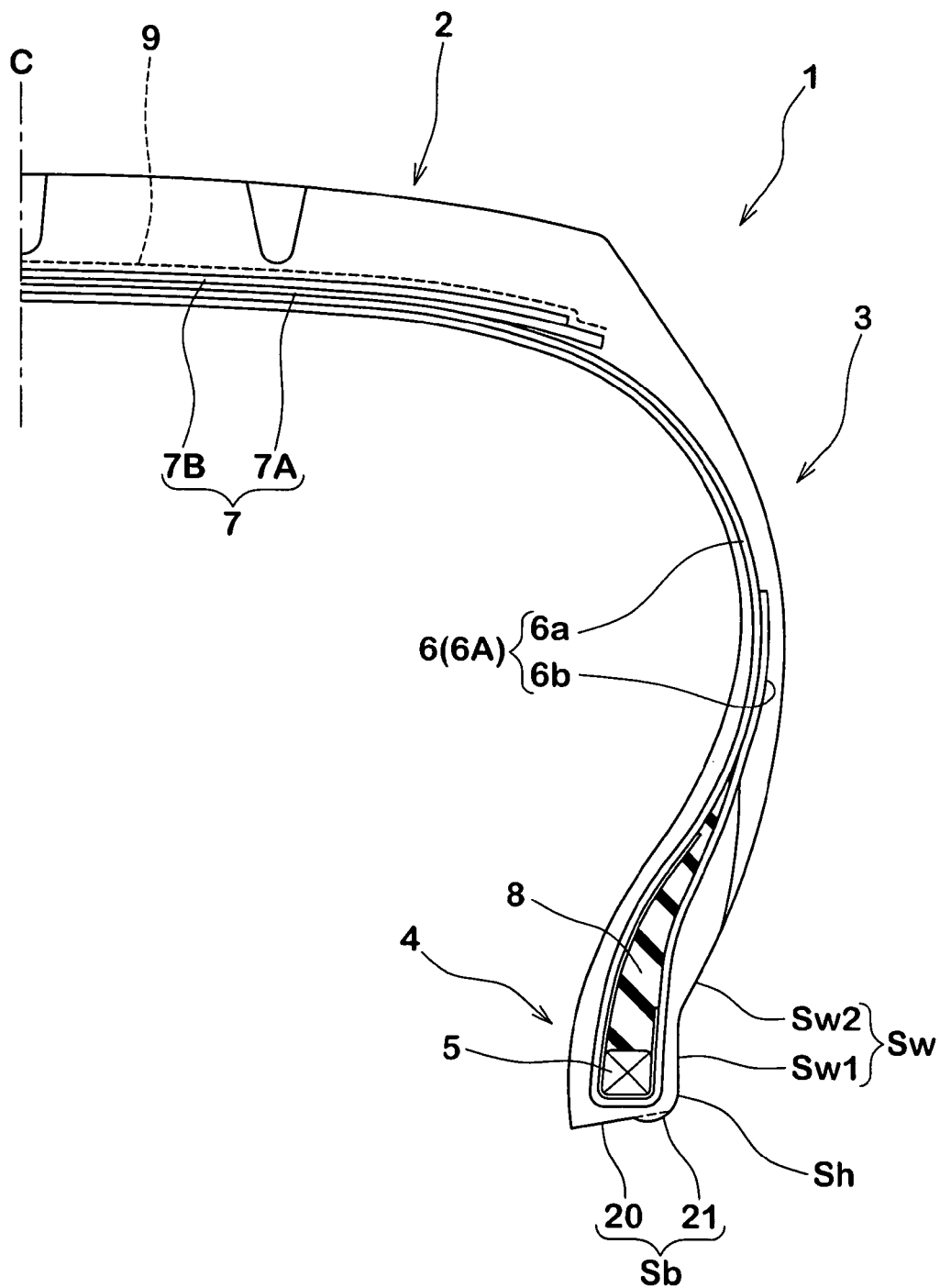
FIG. 1 is a cross sectional view showing an embodiment of a pneumatic tire in accordance with the present invention.

In the drawings, a pneumatic tire 1 according to the present invention is a tubeless type for passenger car. In FIG. 1, the pneumatic tire 1 comprises: a tread portion 2; a pair of sidewall portions 3; a pair of bead portions 4 each with a bead core 5 therein; a carcass 6 comprising at least one ply 6A of cords; and a belt 7 disposed radially outside the carcass in the tread portion 2.

The carcass 6 comprises at least one ply 6A of cords inclined at angle of from 70 to 90 degrees with respect to the tire equator C. In this embodiment, the carcass 6 comprises one carcass ply 6A. For the carcass cords, organic fiber cords, e.g. aromatic polyamide, polyester, rayon, nylon and the like can be suitably used. However, steel cords also may be used.

The carcass ply 6A extends between the bead portions 4 and turned up around the bead core 5 in each bead portion 4 from the axially inside to outside of the tire so as to form a pair of turnup portions 6b and a main portion 6a therebetween.

A rubber bead apex 8 between the main portion 6a and the turnup portion 6b is disposed in each bead portion 4. The bead apex 8 extends and tapers from an radially outer surface of the bead core 5.

In this embodiment, the belt 7 comprises two cross belt plies 7A and 7B of parallel cords laid at an angle of from 10 to 35 degrees with respect to the tire equator C. For the belt cords, steel cords, and high modulus organic fiber cords such as aramid, rayon and like can be used.

In order to further improve the high-speed durability of the belt 7, a band 9 which covers with both shoulder regions of the belt 7 at least and has cords with an angle of not more than 5 degrees with respect to the tire equator C is disposed radially outside the belt 7 in the tread portion 2.

The bead core 5 is a ring formed by winding a wire predetermined times into a rectangular cross sectional shape in this example. For the wire, a steel wire is preferable, but high modulus organic fiber cords, e.g. aromatic polyamide and the like can be used.

Figure 2:
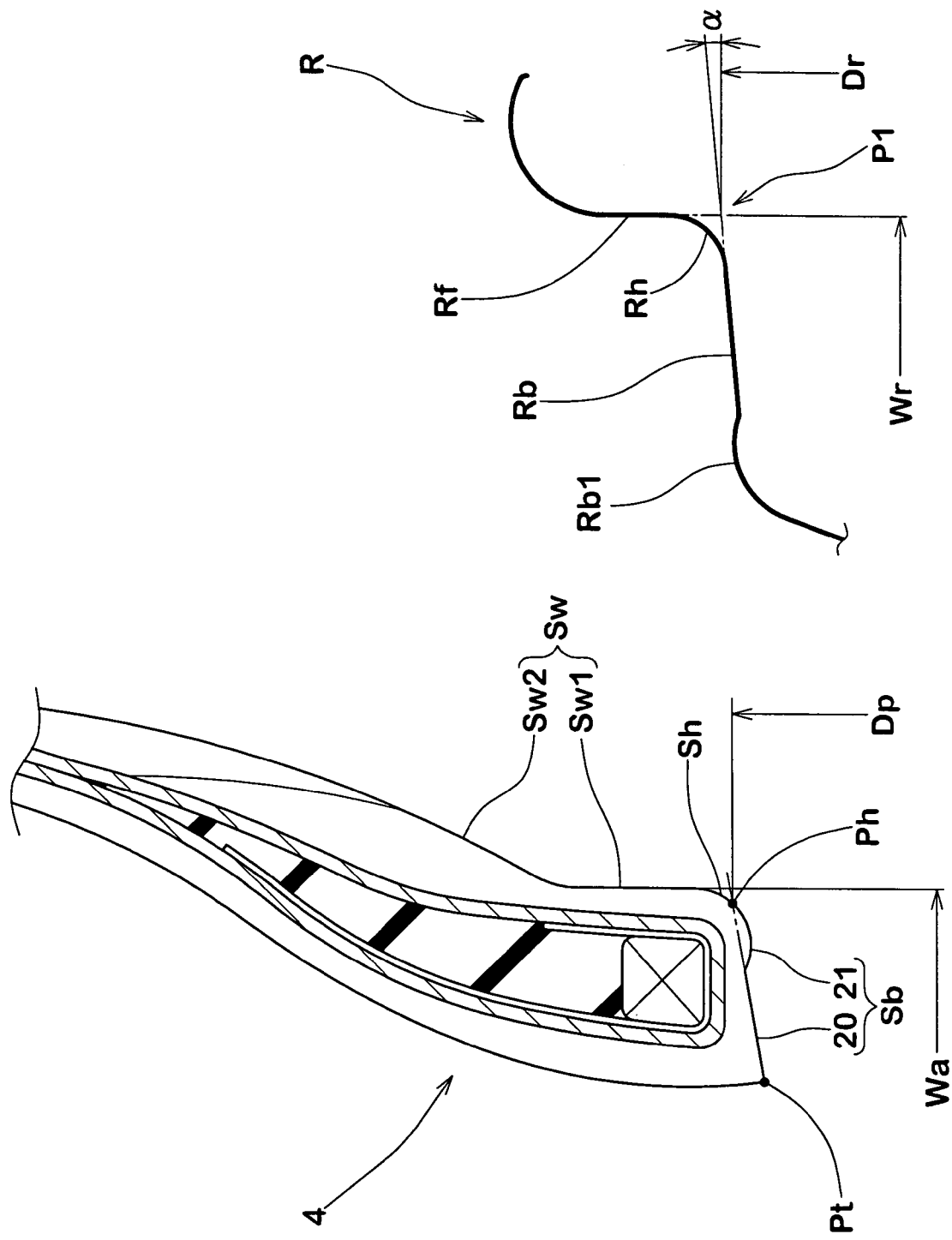
FIG. 2 is an enlarged cross sectional views showing a bead portion and a profile of a rim.

A rim R for mounting the tire 1, as shown in FIG. 2, has a profile for contacting with tire which comprises a rim base surface Rb extending substantially straight with an inclination angle alpha with respect to the tire axial direction, an inner surface Rf of a rim flange extending substantially vertically, a heel surface Rh connecting between the rim base surface Rb and the inner surface Rf of the rim flange and curved into a circular arc, and a hump Rb1 provided with axially inside of the rim base surface Rb and protruding outside in the tire radial direction.

The rim R according to the present embodiment is a five-degree taper rim which has a taper angle alpha of the rim base surface Rb is about 5 degrees with respect to the tire axial direction. Further, the rim R has a rim-diameter Dr that is a diameter of an intersecting point P1 of an expanded lines of the rim base surface Rb with an expanded line of the inner surface Rf of the rim flange.

Further, for the rim R, a standard rim is used. Here, the standard rim is the "standard rim" specified in JATMA, the "Measuring Rim" in ETRTO, the "Design Rim" in TRA or the like.

The bead portion 4, as shown in FIG. 2, has a profile comprising: a bead toe Pt; a heel side point Ph which is a point on the bead surface near the heel and has a diameter DP in a range of from 99.1 to 99.3% of the rim-diameter Dr of the rim R; a bead base Sb which extends from the bead toe Pt to the heel-side point Ph and to be mounted on the rim base surface Rb; an axially outer surface Sw to be supported by the inner surface Rf of the rim flange; and a heel surface Sh connecting between the bead surface Sb and the outer surface Sw and curved into a circular arc.

The outer surface Sw comprises an inside part Sw1 which extends straight from the heel surface Sh to the radially outside and is supported by the inner surface Rf of the rim flange Rf and an outside part Sw2 which is provided radially outside the inside part Sw2.

Figure 3:
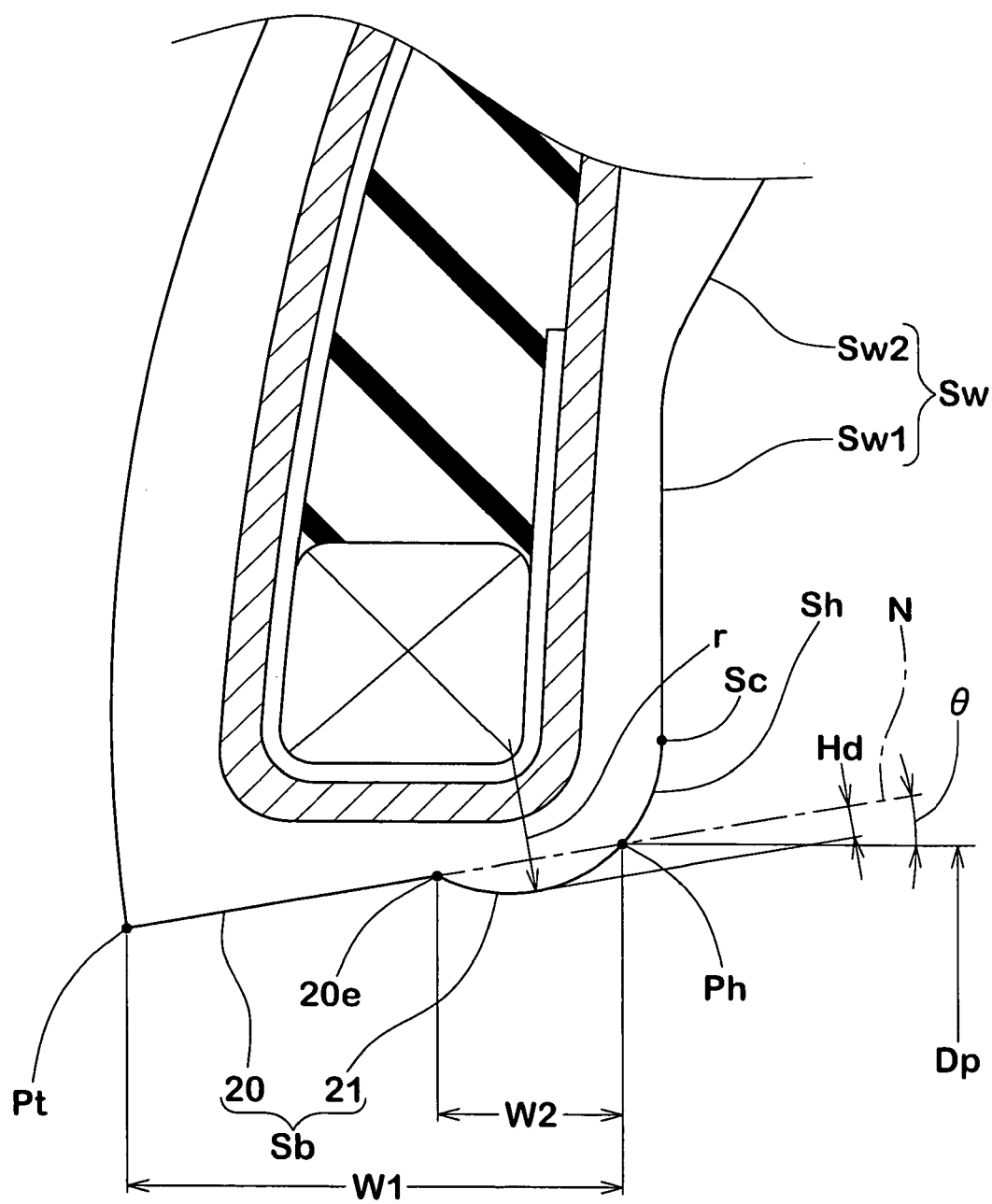
FIG. 3 is an enlarged cross sectional view of the bead portion.

In a meridian section of the tire under a non-mounted state that the tire 1 is not mounted on the rim R but the bead portions 4 are held such that the bead width Wa is equal to the rim width Wr of the rim R, the bead base Sb comprises a straight part 20 and a convex part 21 as shown in FIGS. 2 and 3.

The straight part 20 extends from the bead toe Pt toward the heel-side point Ph with an inclination theta so that an extended line N of the straight part 20 passes through the heel-side point Pt. The angle theta of the inclination of the straight part 20 is preferably more than 0 degree but not more than 15 degrees with respect to the tire axial direction.

The convex part 21 is provided between the axially outer end 20e of the straight part 20 and the heel-side point Ph, and protrudes toward inside from the extended line N.

The convex part 21 is formed into a circular arc with a radius of curvature r of from 0.20 to 0.33 times a base width W1 of the bead base Sb. Here, the bead base width W1 is a width between the bead toe Pt and the heel-side point Ph in the tire axial direction.

Further, the convex part 21 has a protruding height Hd perpendicular from the extended line N of from 0.067 to 0.13 times the bead base width W1.

Since the bead base Sb is formed into an un-flat shape by providing the convex part 21, contacting pressure with rim base surface Rb is increased partially. Thus, even if an internal pressure of the tire 1 becomes low such as a puncture, the convex part 21 can work as a friction brake which prevents a slip of the bead base Sb with the rim base surface Rb.

Further, even if the bead base Sb begins slip to inside of the tire axial direction with the rim base surface Rb, the convex part 21 can engage with the hump Rb1 of the rim R so that the further slip can be prevented. Therefore, the tire 1 in accordance with the present invention can improve resistance to displacement of the bead portion 4.

Here, if the radius of curvature r of the convex part 21 is less than 0.20 times the bead base width W1 or the protruding height Hd is less than 0.067 times the width W1, the convex part cannot work effectively to prevent such a slip with the rim base surface Rb.

On the other hand, if the radius of curvature r of the convex part 21 is more than 0.33 times the bead base width W1 or the protruding height Hd is more than 0.13 times the width W1, it is hard to mount such a bead portion with a great convex part onto the rim R. In this point of view, it is preferable that the convex part 21 has an axial width W2 of from 0.20 to 0.33 times the bead base width W1 of the bead base Sb.

Also, in this embodiment, the convex part 21 and the heel part Sh are drawn by a single circular arc having the radius of curvature r which extending from the axially outer end 20e of the straight part 20 to an end of the heel surface Sh. However, these parts 21 and Sb each may have its own circular arc with different radius of curvature each other.

Figure 4:
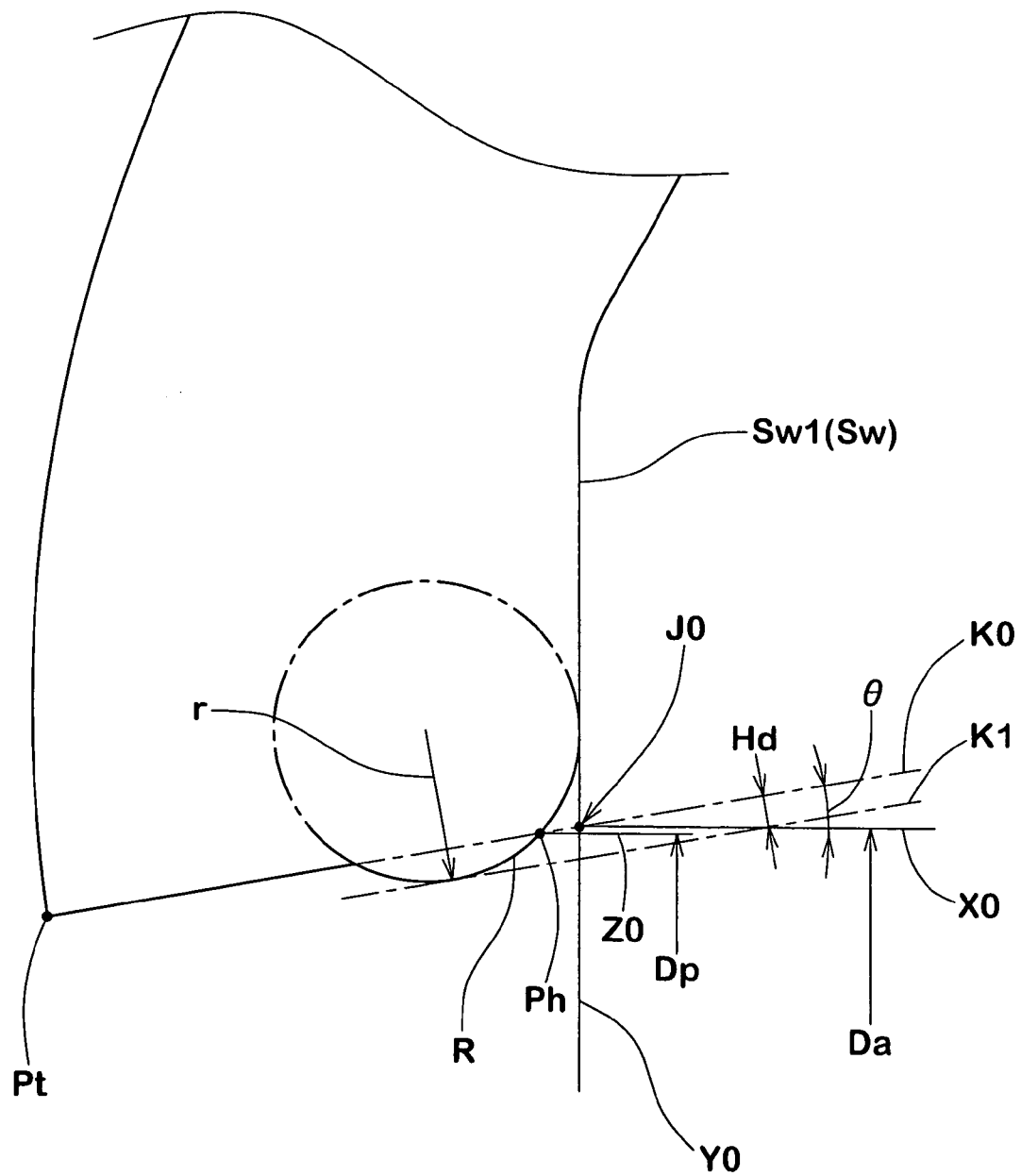
FIG. 4 is a profile of the bead portion in accordance with a present embodiment for explaining how to design thereof.
Figure 5:
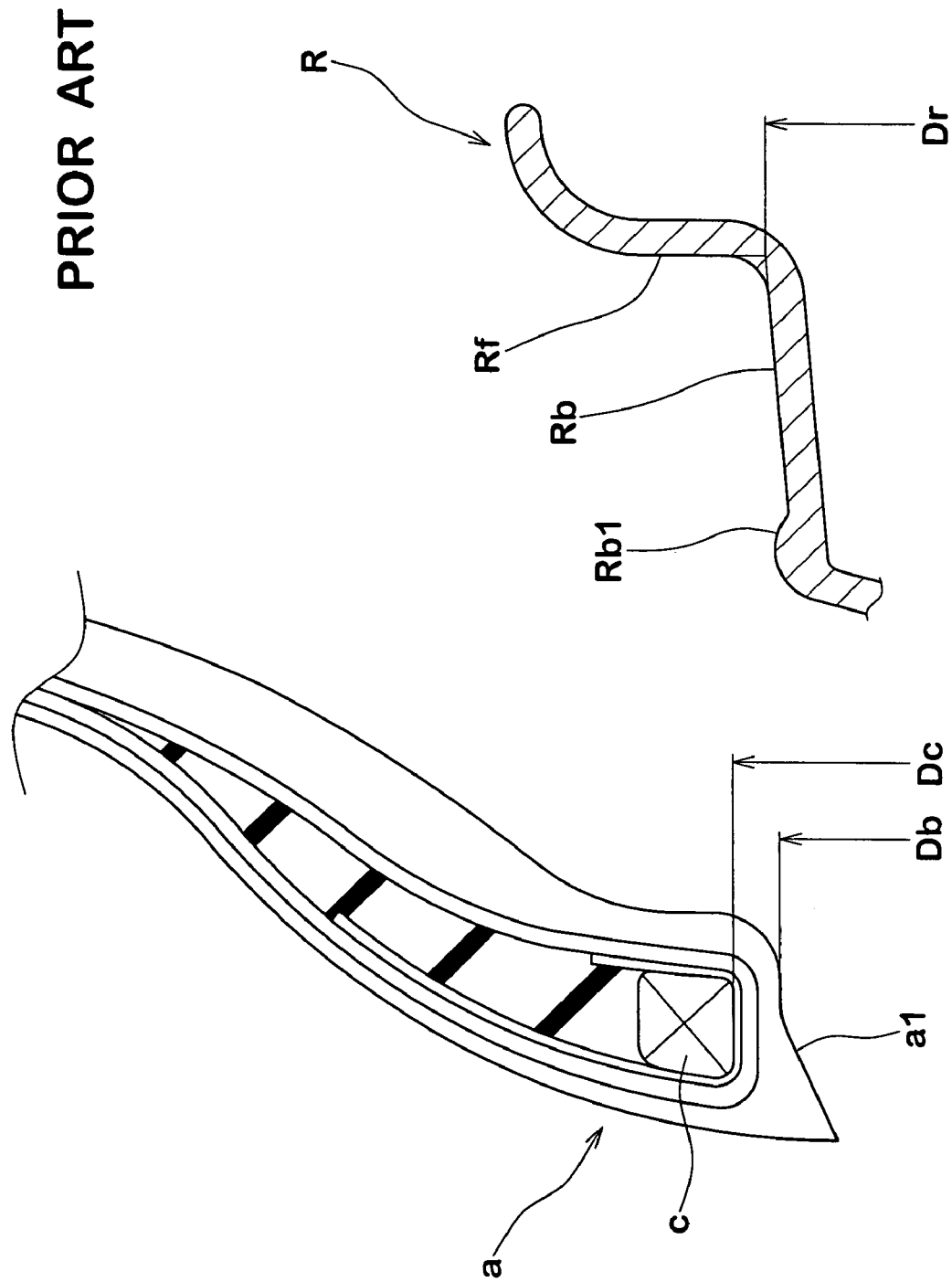
FIG. 5 is a cross sectional views showing a bead portion of the prior art and a rim.

FIG. 4 shows a profile of the bead portion 4 in accordance with the present invention for explaining one aspect of how to design thereof. First, a first inclined line K0 that has the angle theta with respect to the tire axial direction and passes through a point J0 which intersects an extended line Y0 of the inside part Sw1 with an axial line having a diameter Da is defined. Here, the diameter Da is substantially equal to the diameter Db as shown in FIG. 5. Thus, the diameter Da has a smaller 0.7% than the rim-diameter Dr.

Next, the second inclined line K1 that is parallel to the first inclined line K0 and separates from the line K0 with a distance Hd is defined.

Next, a circular arc R which has the radius of curvature r and comes into contact with both a surface of the inside part Sw1 of the bead portion and the second inclined line K1 is defined so that the diameter Dp of the heel-side point Ph is 99.1 to 99.3% of the rim-diameter Dr.

With this, the profile of the bead portion in accordance with the present invention is obtained.

Comparison Test:

Test tires of size 205/60R16 having the same structure shown in FIGS. 2 and 3 except for the bead profile were made and tested for the resistance to bead unseating and the difficulty in mounting the tire on a standard rim as follows.

Resistance to Bead Unseating Test:

A test car provided with a pair of test tires for front wheels made a U-turn, and then a lateral acceleration thereof when a bead unseating of the tire occurred was measured (Turning radius 25 meters, Initial speed 40 km/hr, Tire pressure 50 kPa, and Rim size 6.0J×16). The results are indicated in Table 1 by an index based on Ref.1 being 100, wherein the larger the index number, the better the resistance to bead unseating.

Tire Mounting Test:

Using a hand tool (tire lever), the test tires were mounted on a standard rim, and the degree of difficulty was evaluated by a skilled person. The results are indicated in Table 1 by an index based on Ref.1 being 100, wherein the smaller the index number, the better the tire mounting test. Especially, the quality passed of the mounting test is indicated by the index number of 90 or more The test results and the specifications of the tires are shown in Table 1.

TABLE 1

|  | Conv. | Ref. 1 | Ex. 1 | Ex. 2 | Ex. 3 | Ex. 4 | Ex. 5 | Ref. 2 |
| --- | --- | --- | --- | --- | --- | --- | --- | --- |
| Base width w1 [mm] | 15 | 15 | 15 | 15 | 15 | 15 | 15 | 15 |
| Radius of curvature r of convex part [mm] | Not applied | 3.0 | 3.0 | 3.0 | 4.0 | 5.0 | 5.0 | 5.0 |
| Ratio(r/w1) | — | 0.20 | 0.20 | 0.20 | 0.27 | 0.33 | 0.33 | 0.33 |
| Protruding height Hd [mm] | — | 0.8 | 1.5 | 2.0 | 1.0 | 1.7 | 1.5 | 2.2 |
| Ratio(Hd/w1) | — | 0.053 | 0.10 | 0.13 | 0.067 | 0.11 | 0.10 | 0.15 |
| width of convex part w2 [mm] | — | 5.0 | 5.0 | 3.6 | 3.8 | 3.8 | 3.0 | 3.0 |
| Ratio(w2/w1) | — | 0.33 | 0.33 | 0.24 | 0.25 | 0.25 | 0.20 | 0.20 |
| Ratio(Dp/Dr) [%] | 99.3* | 99.3 | 99.3 | 99.3 | 99.1 | 99.2 | 99.3 | 99.3 |
| Resistance to bead unseating test [index number] | 80 | 100 | 105 | 110 | 110 | 115 | 125 | 135 |
| Tire Mounting test [Index number] | 100 | 100 | 95 | 90 | 100 | 90 | 95 | 85 |

*This means a value of ration(Db/Dr).

The invention claimed is:

1. A pneumatic tire and rim assembly comprising:
a pneumatic tire and a rim;
the pneumatic tire comprising:
a tread portion,
a pair of sidewall portions,
a pair of bead portions each having a bead core therein,
a carcass comprising at least one ply of cords, wherein
in a meridian section of the tire under a non-mounted state that the tire is not mounted on the rim but the bead portions are held such that the bead width is equal to the rim width of the rim:
said each bead portion has a profile comprising:
a bead toe,
a heel-side point being a point on the bead surface near the heel and having a diameter in a range of from 99.1 to 99.3% of a rim-diameter of the rim, and
a bead base extending between the bead toe and the heel-side point;
the bead base comprising:
a base width between the bead toe and the heel-side point in the tire axial direction,
a straight part extending on a straight line passing through both of the bead toe and the heel-side point having an inclination of more than 0 to 15 degrees with respect to the axial direction of the tire,
a convex part provided between an axially outer end of the straight part and the heel-side point and protruding radially inside of the straight line, and
the convex part having a radius of curvature of from 0.20 to 0.33 times the base width and a protruding height from the extended line of from 0.067 to 0.13 times the base width, wherein the convex part has a radius of curvature of from 3.0 to 5.0 mm, and a width of the convex part in the tire axial direction is in a range of from 0.20 to 0.25 times the base width.

2. The pneumatic tire and rim assembly according to claim 1, wherein the profile of the bead portion further comprises an axially outer surface to be supported by the inner surface of a rim flange of the rim and a heel part connecting between the axially outer surface and the heel-side point and curved into a circular arc, and the convex part and the heel part are drawn by a single arc continuously.

3. pneumatic tire and rim assembly according to claim 1, wherein the convex part has a radius of curvature of from 4.0 to 5.0 mm.

* * * * *